UNITED STATES PATENT OFFICE.

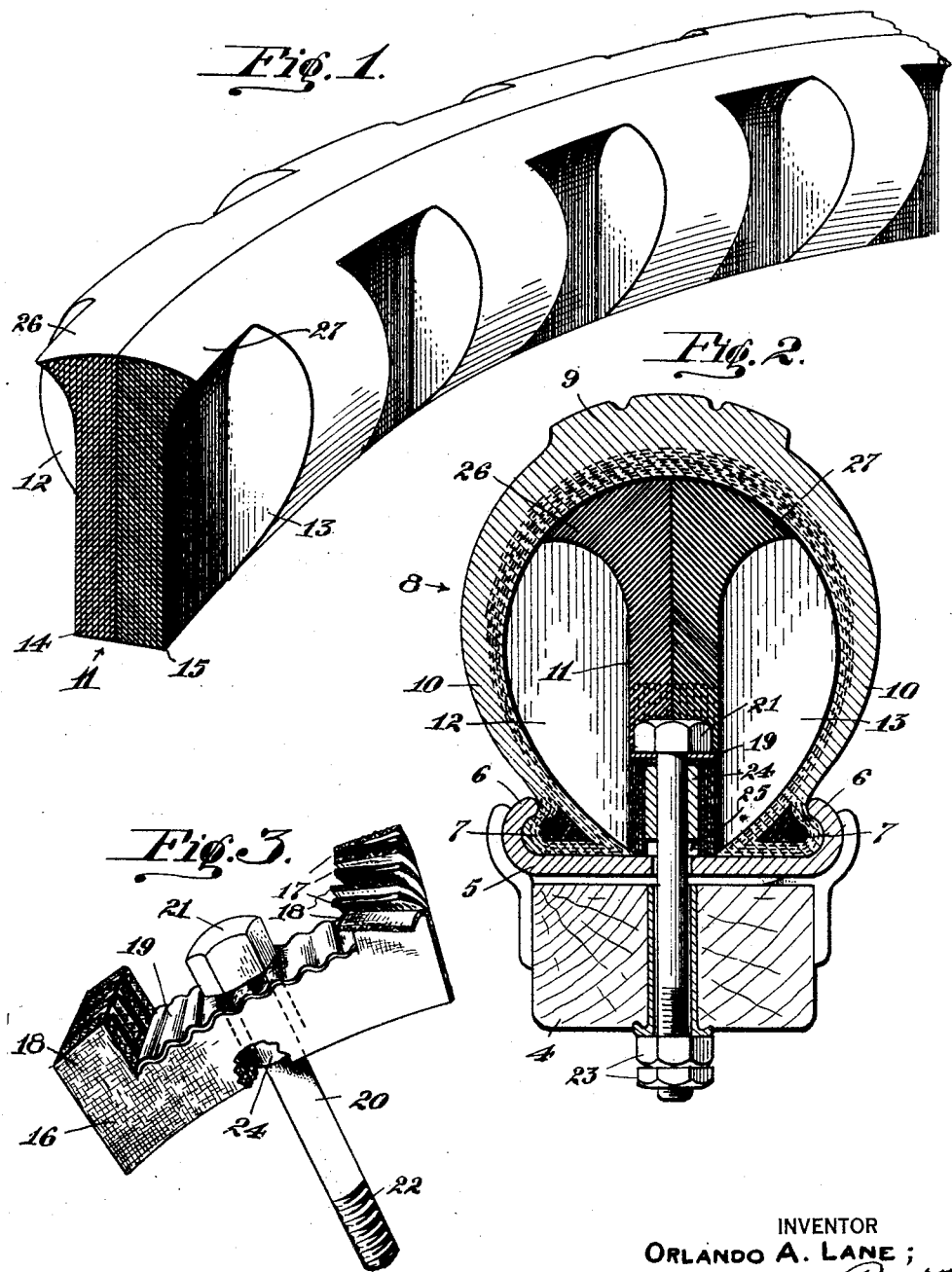

ORLANDO A. LANE, OF LOS ANGELES, CALIFORNIA, ASSIGNOR TO NATIONAL AIRLESS TIRE COMPANY, OF RENO, NEVADA, A CORPORATION OF NEVADA.

TIRE.

1,404,459.  Specification of Letters Patent.  Patented Jan. 24, 1922.

Application filed October 21, 1919. Serial No. 332,174.

*To all whom it may concern:*

Be it known that I, ORLANDO A. LANE, a citizen of the United States, residing at Los Angeles, in the county of Los Angeles and State of California, have invented new and useful Improvements in Tires, of which the following is a specification.

This invention relates to a tire and particularly pertains to a tire of the semipneumatic type for the wheels of auto-vehicles and the like, and to the method of making the same.

It is the object of this invention to provide a tire which embodies the desirable qualities of a pneumatic tire, yet does not require inflation and is not subject to puncture or blow out, and which also possesses the advantages of a solid rubber or cushion tire with the added advantage of greater resiliency and lightness in weight.

Another object is to provide a means and method for forming dead air cells in a tire casing and reinforcing the latter with transverse and circumferential walls in such a manner as to provide a light substantial resilient body capable of supporting heavy loads and of withstanding the various strains to which a tire is ordinarily subjected.

A further object is to provide a construction whereby the casing of an ordinary pneumatic tire may be readily converted into a non-inflatable tire by which old and practically worn out casings may be reused and employed indefinitely by occasionally renewing the tread thereof.

Other objects will appear hereinafter.

In carrying out my invention I provide a filler for a tire casing embodying a resilient annulus adapted to extend circumferentially of a tire casing interiorly thereof and having a series of arched ribs on its sides for supporting the side walls of the casing, a novel means being employed for fastening the device on a wheel rim.

The invention is illustrated in the accompanying drawings, in which:

Figure 1 is a perspective view of the casing filler;

Figure 2 is a view of an ordinary tire casing as seen in cross section showing the invention as applied and illustrating the manner of anchoring the tire on a wheel rim.

Figure 3 is a detail in perspective illustrating the anchoring means.

More specifically, 4 indicates a wheel felly fitted with a metallic rim 5 having side flanges 6 for engagement with the bead rims 7 of the casing 8 of an ordinary pneumatic tire; the casing being divided circumferentially on its inner periphery and formed with a tread portion 9 and side portions 10, as is common in pneumatic tire construction.

The present invention particularly resides in a filler for the casing and in a means for mounting same within the casing and attaching it to the wheel felly and rim. This filler comprises a resilient annulus 11 having a series of spaced arched ribs 12 and 13 projecting from its opposite sides; the annulus 11 being designed to bear between the tread portion 9 of the casing and the wheel rim 5 with the ribs 12 and 13 bearing against and supporting the casing side walls 10.

A novel feature of this invention resides in the manner of forming the filler, which consists in molding the ribs 12 and 13 in depressions formed in separate annular molds, then building up a pair of annular bodies 14 and 15 of layers of rubber connecting the ribs in the mold. The annular members 14 and 15 are then placed face to face while in the mold and the whole vulcanized to form a resilient homogeneous body which is designed to be placed in the interior of the casing which is formed separately.

If desired, the filler and casing may be but partly cured in their initial vulcanizing operation and the cure completed after placing the filler in the casing, so as to effect a homogeneous connection between the filler and casing and produce a completed tire as an article of manufacture. However, the filler may be disposed in an ordinary casing and vulcanized thereto, thus permitting the use of the filler in connection with the various standard casings now on the market.

Embedded in the annulus 11 on its inner periphery and extending circumferentially thereof at a convenient point is a series of layers of fabric strips 16 which strips have rubber layers 17 interposed therebetween and are arranged so that the strips will extend parallel with the side faces of the annulus with the lower edges flush with the inner periphery of the annulus and the upper edges intermediate the inner and outer peripheries thereof. As a means for securely anchoring the fabric within the annulus, the end portions of the fabric strips are formed with upwardly projecting tangs 18 to project a greater distance into the annulus.

Embedded in the annulus and seating on the upper edges of the fabric strips is a metallic plate 19 preferably corrugated to effect a substantial tie and extending through this plate and between the fabric strips is a bolt 20 having a head 21 seating on the plate 19 and embedded in the annulus. This bolt 20 extends radially of the annulus and has a threaded outer end 22 adapted to project through an opening in the rim 5 and the felly 4 and to receive nuts 23, whereby the annulus may be detachably connected to the rim and securely held against creeping thereon.

As a means for preventing the strain on the bolt from tearing out the fabric strips, a spacing sleeve 24 is placed around the bolt with its upper end seating against the under side of the plate 19 and its lower end spaced from the lower edges of the fabric and disposed on a plane within the inner periphery of the annulus, as indicated at 25 in Figure 2. This spacing of the sleeve permits a slight distortion or lateral expansion of the annulus tending to tightly crowd the casing ribs 7 into engagement with the rim flanges.

As a means for affording a substantial backing for the tread 9, the outer portion of the annulus is formed with side flanges 26 and 27 which project opposite the major portion of the tread between the ribs 12 and 13.

I claim:

A cushion tire comprising a tubular annular outer casing divided circumferentially on its inner periphery, a resilient filler encompassed by said casing comprising a continuous annular wall extending between the tread portion of the casing and the divided inner periphery of the latter with its inner periphery substantially flush with the inner periphery of the casing; said wall being spaced from the side walls of the casing and arranged midway therebetween with the side faces of the wall extending parallel to each other from its inner periphery to near its outer periphery and terminating flush with the margins of the divided side portions of the casing, and a series of transverse ribs extending outwardly from the opposite sides of the wall; said ribs spaced apart throughout the annular wall forming air pockets therebetween, the outer faces of said ribs and the outer peripheral face of the wall being affixed throughout to the inner wall of the casing to adhere thereto and form an integral structure; the inner end portions of said ribs terminating substantially flush with the inner peripheries of the annular wall and the casing.

ORLANDO A. LANE.